United States Patent [19]

You

[11] Patent Number: 5,910,214
[45] Date of Patent: Jun. 8, 1999

[54] PROCESS FOR PREPARING CALCIUM CARBONATE

[76] Inventor: Kyu Jae You, 48, Nackdong-ri, Nam-myon, Jungsun-kun, Kangwon-do, Rep. of Korea

[21] Appl. No.: 08/927,570

[22] Filed: Sep. 8, 1997

[30] Foreign Application Priority Data

Sep. 11, 1996 [KR] Rep. of Korea .................. 96-39234

[51] Int. Cl.$^6$ ............................. C09C 1/02; C01F 5/24
[52] U.S. Cl. ................. 106/465; 423/432; 423/419.1
[58] Field of Search .................................. 106/464, 465; 423/430, 432, 419.1; 241/16, 21, 15, 22; 526/240; 428/511

[56] References Cited

U.S. PATENT DOCUMENTS

| | | | |
|---|---|---|---|
| 4,175,066 | 11/1979 | Shibazaki et al. | 428/511 |
| 4,555,557 | 11/1985 | Fukumoto et al. | 526/240 |
| 4,606,503 | 8/1986 | Bleeck | 241/16 |
| 5,007,964 | 4/1991 | Tsukisaka et al. | 106/465 |
| 5,380,361 | 1/1995 | Gill | 106/465 |
| 5,494,651 | 2/1996 | Minayoshi et al. | 423/432 |
| 5,533,678 | 7/1996 | Strauch et al. | 241/16 |
| 5,605,568 | 2/1997 | Naydowski et al. | 106/464 |
| 5,750,086 | 5/1998 | You | 423/432 |
| 5,833,747 | 11/1998 | Bleakley et al. | 423/432 |

*Primary Examiner*—Michael Marcheschi
*Attorney, Agent, or Firm*—Blakely Sokoloff Taylor & Zafman

[57] ABSTRACT

A process for producing calcium carbonate particles having an average size of 0.3±0.1 μm, the process comprising the steps of preparing light calcium carbonate particles of 0.6±0.4 μm in average size by carbonating calcium hydroxide suspended in water, drying and pulverizing the light calcium carbonate particles, admixing the dry powders thereof with a dispersing agent, and wet-grinding the slurry. The final product imparts high opacity and brightness to coated papers when it is used as a pigment.

2 Claims, No Drawings

PROCESS FOR PREPARING CALCIUM CARBONATE

BACKGROUND OF THE INVENTION

The present invention relates to a process for the production of calcium carbonate, and in particular, to a process for the production of calcium carbonate particles of uniform size in the range of 0.3±0.1 μm, which are suitable as a pigment for coated papers.

Throughout the specification and appended claims, the term "size" of calcium carbonate particles refers to the length of one edge of the particles, as measured by electron microscopy analysis, and parts and percentages are all by weight unless otherwise specified.

The calcium carbonate used in industry may be categorized into two groups, i.e., heavy calcium carbonate and precipitated calcium carbonate. Heavy calcium carbonate is prepared by pulverizing limestone into fine particles and then classifying the resultant powders. On the other hand, precipitated calcium carbonate having an average particle size not greater than 5 μm is prepared by reacting calcium and carbonate ions.

Precipitated calcium carbonate particles are manufactured by "liquid-liquid" process or by "liquid-gas" process. In the liquid-liquid process, a solution containing ions, such as sodium carbonate and ammonium carbonate, is reacted with a solution of a calcium compound, such as calcium chloride and calcium acetate. The liquid-gas process is further divided into a so called "forward reaction" process, in which a carbon dioxide-containing gas is introduced into an aqueous suspension of calcium hydroxide, and a so called "reverse reaction" process, in which a calcium hydroxide suspension is added into a carbon dioxide-saturated water. According to the liquid-gas process, so called colloidal calcium carbonate having a cube-like particulate configuration and an average particle size of about 0.04 μm, or so called light calcium carbonate having a spindle-like particulate configuration and an average particle size greater than 1 μm are obtained. These colloidal and light calcium carbonate particles are currently used as fillers in various industrial fields, such as rubbers, plastics, paints, inks, sealants, and papers.

In particular, fine-sized calcium carbonate having a uniform particle size in the range of 0.1 to 1.0 μm, which shows reduced aggregational affinity and improved characteristics of dispersibility and fluidity and imparts high opacity and brightness to coated papers, is in strong demand. Colloidal calcium carbonate particles having an average size less than 0.1 μm show strong affinity of aggregation, and may not provide high opacity to the end product. On the other hand, light calcium carbonate particles are not suitable as a pigment for paper coatings, since a slurry thereof shows a strong dilatant property, although a thixotropic property is required in the paper-coating process.

In a conventional process, it is suggested to heat and age a suspension containing calcium carbonate particles of 0.04 μm in average size until the particles grow to an average size of about 0.08 μm. However, calcium carbonate particles manufactured by this process have widely varying sizes, and the process itself is not economical.

U.S. Pat. No. 3,848,059 provides a process, in which spheroidal shaped reticulated precipitated calcium carbonate of 0.1 to 5 μm is prepared by the double decomposition of two water-soluble salts such as calcium chloride and potassium carbonate dissolved in water droplets of two water-in-oil emulsions.

U.S. Pat. No. 4,018,877 (R. D. A. Wood) describes a carbonation process in which a complex-forming agent for calcium ions is added to an aqueous suspension of calcium hydroxide after the calcium carbonate primary nucleation stage, but before completion of the carbonation stage. Optionally, a long-chain fatty acid or long-chain fatty acid salt can be added, preferably after a final carbonation stage.

U.S. Pat. No. 4,124,688 (H. Shibazaki et al.) provides a process for preparing cubic calcium carbonate crystals of about 0.1 to about 1.0 μm in size, which process comprises a first step of spraying a starting aqueous suspension containing calcium hydroxide and cubic calcium carbonate crystals into a carbon dioxide-containing gas, and a second step of adding calcium hydroxide to the aqueous suspension resulting from the first step and spraying the mixture into a carbon dioxide-containing gas.

U.S. Pat. No. 5,075,093 (H. Tanaka et al.) describes a two-step carbonation method of a milk of lime in which partially carbonated milk of lime is admixed with an aqueous carbonating solution containing an alkali metal carbonate or ammonium carbonate and an alkali metal hydroxide or ammonium hydroxide to complete the carbonation of calcium hydroxide. Particles having a platelet-like configuration of a thickness in the range of 0.1 to 0.3 μm and dimensions within the plane of the platelet from 0.5 to 2 μm are obtained.

Japanese Patent Disclosure (Kokai) No. 89-18911 relates to a process for preparing calcium carbonate spindle particles having an average minor axis of 0.1 to 1 μm and an average major axis of 0.6 to 3 μm in which a sulphate compound is added to a water slurry of calcium hydroxide and carbon dioxide is blown into the water slurry.

SUMMARY OF THE INVENTION

Accordingly, it is an object of the present invention to provide a process for preparing calcium carbonate particles of a uniform size in the range of 0.3±0.1 μm.

Another object of the present invention is to provide a process for preparing calcium carbonate particles of a uniform size which show the reduced aggregational affinity and the thixotropic property, and impart the high opacity and brightness to a coated paper when they are used as a pigment.

A further object of the present invention is to provide a process for preparing calcium carbonate particles of a uniform size which are suitable as a filler for plastics, such as polyethylene telephtalate, when they are coated with organic acids, such as higher fatty acids and rosin acids.

The inventor suspects that rhombohedral calcium carbonate particles having an average size of 0.04 μm may grow to an average size of 0.3 μm, and may then be regularly arranged by parallel intergrowth, so that spindle-like light calcium carbonate particles having an average size greater than 1 μm can be obtained.

Thus, the process of the present invention for the production of calcium carbonate particles of uniform size in the range of 0.3±0.1 μm comprises the steps of:

(a) introducing a gas containing 20 to 40% by weight of carbon dioxide into an aqueous suspension of calcium hydroxide having a concentration of 6 to 10% by weight and a temperature of 20° C. to 30° C., at a flow rate of 50 to 100 liters per minute per kg of the calcium hydroxide, to prepare a suspension containing light calcium carbonate particles having an average size of 0.6±0.4 μm;

(b) dehydrating the suspension from step (a) and then subjecting it to drying and pulverizing to prepare dry powders thereof;

(c) admixing the light calcium carbonate powders with 0.5 to 1.0 part by weight of a dispersing agent comprising sodium polyacrylate and a sodium salt of a copolymer of acrylic acid and maleic acid per 100 parts by weight of the light calcium carbonate powders, such that a slurry showing a thixotropic property is obtained, the polymerization ratio of the acrylic acid and the maleic acid in the copolymer being in the range of 1:0.5 to 1:1.5; and (d) wet-grinding the slurry from step (c) in a sand mill.

DETAILED DESCRIPTION OF THE PREFERRED EMBODIMENT

The present invention will be described below in greater detail.

(1) A gas containing 20 to 40% by volume of carbon dioxide is introduced into an aqueous suspension of calcium hydroxide having a concentration of 6 to 10% by weight and a temperature of 20° C. to 30° C., at a flow rate of 50 to 100 liters per minute per kg of the calcium hydroxide. The resultant suspension containing light calcium carbonate particles is dehydrated in a centrifugal separator, and subsequently subjected to drying and pulverizing so that dry powders of light calcium carbonate, which are readily wet-grinded and have an average size of 0.6±0.4 μm, are prepared.

(2) 0.5 to 1.0 part by weight of a dispersing agent comprising sodium polyacrylate and a sodium salt of a copolymer of acrylic acid and maleic acid, with a polymerization ratio in the copolymer of 1:0.5 to 1:1.5, per 100 part by weight of the light calcium carbonate powders to be admixed therewith is prepared in a stirred vessel. The calcium carbonate powders are gradually added to the vessel with an initial stirring of 50 to 100 rpm. When the solid content in the slurry reaches 60 to 70% by weight, the slurry is now stirred at a speed not less than 2,000 rpm, and thereby the rheological property of the slurry is changed from dilatant to thixotropic.

(3) The resultant slurry is wet-grinded in a sand mill, in which beads made of glass, zircon, high contents alumina and so on are filled, and consequently finely divided calcium carbonate particles having an average size of 0.3±0.1 μm are obtained.

Although a cake containing 60 to 70% by weight of light calcium carbonate may be used for the wet-grinding, it is more advantageous to use dry pulverized light calcium carbonate for imparting superior quality to the coated papers.

If the solid content in the slurry is less than 60%, and the amount of the dispersing agent added is less than 0.5 part, it is difficult to sufficiently wet-grind the slurry and to obtain a final slurry having a viscosity measured by Brookfield-Marian viscometer (to be hereinafter referred to simply as "BM viscosity"), not greater than 300 cps at 60 rpm, and the product particles will have widely varying sizes.

In addition, if the solid content in the slurry is greater than 70%, and the amount of the dispersing agent added is greater than 1.0 part, the slurry may not be smoothly wet-grinded, and uniform calcium carbonate particles of 0.3±0.1 μm in size can not be obtained.

For a better understanding of the present invention, Examples and Comparative Examples are given below.

EXAMPLE 1

A gas containing 30% by volume of carbon dioxide was introduced into an aqueous suspension of calcium hydroxide having a concentration of 8% and a temperature of 25° C., at a flow rate of 60 liters per minute per kg of the calcium hydroxide to obtain a suspension containing light calcium carbonate particles having an average size of 0.6 μm. The resultant suspension was then dehydrated in a centrifugal separator, and subsequently subjected to drying and pulverizing so that dry powders of light calcium carbonate were obtained.

Respective amounts of 0.4 part of sodium polyacrylate and 0.3 part of a sodium salt of a copolymer of acrylic acid and maleic acid, as a dispersing agent, per 100 parts of the light calcium carbonate powders to be admixed therewith, were prepared in a stirred vessel. In this case, the polymerization ratio of the acrylic acid and the maleic acid in the copolymer was 1:1, and the amount of the dispersing agent was equal to 0.7 part per 100 parts of the light calcium carbonate powders. Initially, the slurry was stirred at a lower speed of 60 rpm, and the calcium carbonate powders were gradually added to the slurry. When the solid content reached 60%, the slurry begun to stirred at a higher speed of 2,000 rpm for 1 hour.

The resultant slurry was wet-grinded in a sand mill filled with glass beads of 2 mm Φ with a residence time of 40 minutes. The finally obtained slurry had a BM viscosity of 190 cps at 60 rpm, and the product calcium carbonate had a uniform average size of 0.3 μm.

EXAMPLE 2

Example 1 was repeated except that the amounts of the sodium polyacrylate and the sodium salt of the copolymer were 0.5 part and 0.4 part, respectively, and the solid content in the slurry to be wet-grinded was 68%. As a result, the final slurry had a BM viscosity of 200 cps at 60 rpm and the product calcium carbonate had a uniform average size of 0.3 μm.

The detailed experimental conditions and results of the Examples and Comparative Examples are given in Table 1.

TABLE 1

| | | Examples | | | | | | | | | |
|---|---|---|---|---|---|---|---|---|---|---|---|
| | | Example | | | Comparative Examples | | | | | | |
| parameters | | 1 | 2 | 3 | 1 | 2 | 3 | 4 | 5 | 6 | 7 |
| suspension of Ca(OH)$_2$ | concentration (% by wt) | 8 | 8 | 9 | 8 | 8 | 8 | 8 | 8 | 8 | 12 |
| | temperature (° C.) | 25 | 25 | 25 | 25 | 25 | 25 | 25 | 25 | 25 | 25 |

TABLE 1-continued

| parameters | | Example | | | Comparative Examples | | | | | | |
|---|---|---|---|---|---|---|---|---|---|---|---|
| | | 1 | 2 | 3 | 1 | 2 | 3 | 4 | 5 | 6 | 7 |
| $CO_2$* containing gas | concentration (% by vol.) | 30 | 30 | 30 | 30 | 30 | 30 | 30 | 30 | 30 | 30 |
| | flow rate (l/min · kg $Ca(OH)_2$) | 60 | 60 | 50 | 50 | 60 | 60 | 60 | 60 | 60 | 45 |
| $CaCO_3$ before grinding | average particle size ($\mu$m) | 0.6 | 0.6 | 0.5 | 0.6 | 0.6 | 0.6 | 0.6 | 0.6 | 0.6 | 0.6 |
| dispersing agent** | sodium polyacrylate (part) | 0.4 | 0.5 | 0.4 | 0.4 | 0.4 | 0.4 | 0.2 | 0.7 | 0.7 | 0.4 |
| | sodium salt of copolymer (part) | 0.3 | 0.4 | 0.3 | 0.3 | 0.3 | 0.3 | 0.2 | 0.5 | 0 | 0.3 |
| | Total (part) | 0.7 | 0.9 | 0.7 | 0.7 | 0.7 | 0.7 | 0.4 | 1.2 | 0.7 | 0.7 |
| $CaCO_3$ at grinding | solid content (% by wt.) | 60 | 68 | 65 | 60 | 60 | 71 | 60 | 60 | 60 | 60 |
| sand mill | use or not | yes | yes | yes | yes | no | yes | yes | no | yes | yes |
| $CaCO_3$ after grinding | viscosity (cps @ 60 rpm) | 190 | 200 | 240 | 320 | 500 | 550 | 350 | 700 | 400 | 320 |
| | average particle size ($\mu$m) | 0.3 | 0.3 | 0.4 | 0.5 | 0.6 | 0.6 | 0.6 | 0.6 | 0.6 | 0.8 |
| | particle size distribution (uniformity)*** | ○ | ○ | ○ | Δ | X | X | X | X | X | X |

*using a slurry, not dry powders
**polymerization ratio of acrylic acid and maleic acid of 1:1
***○: uniform, Δ: a little uniform, X: multiform It is evident from the Examples that the process according to the present invention provides calcium carbonate particles of uniform size in the range of 0.3±0.1 $\mu$m.

The uniform calcium carbonate powders produced in the process exhibit superior dispersibility and reduced aggregation affinity, and thus it is advantageous to use the powders as a pigment for imparting high opacity and brightness to the coated papers. They may be used as fillers for rubbers, plastics, paints, inks, and sealants as well.

I claim:

1. A process for preparing calcium carbonate having an average particle size in the range of 0.3±0.1 $\mu$m, the process comprising the steps of:

(a) introducing a gas containing 20 to 40% by weight of carbon dioxide into an aqueous suspension of calcium hydroxide having a concentration of 6 to 10% by weight and a temperature of 20° C. to 30° C., at a flow rate of 50 to 100 liters per minute per kg of the calcium hydroxide, to prepare a suspension containing light calcium carbonate particles having an average size of 0.6±0.4 $\mu$m;

(b) dehydrating the suspension from step (a) and then subjecting it to drying and pulverizing to prepare dry powders thereof;

(c) admixing the light calcium carbonate powders with 0.5 to 1.0 part by weight of a dispersing agent comprising sodium polyacrylate and a sodium salt of a copolymer of acrylic acid and maleic acid, per 100 parts by weight of the light calcium carbonate powders, such that a slurry showing a thixotropic property is obtained, the polymerization ratio of the acrylic acid and the maleic acid in the copolymer being in the range of 1:0.5 to 1:1.5; and (d) wet grinding the slurry from step (c) in a sand mill.

2. A process according to claim 1, the process further comprising:

contacting the wet-grinded slurry with a surface-treating agent selected from the group consisting of higher fatty acids and rosin acids, and subjecting the slurry to dehydrating, drying, and pulverizing to obtain a dry product.

* * * * *

UNITED STATES PATENT AND TRADEMARK OFFICE
CERTIFICATE OF CORRECTION

PATENT    : 5,910,214

DATED     : June 8, 1999

INVENTOR(S): Kyu Jae You

It is certified that error appears in the above-identified patent and that said Letters Patent is hereby corrected as shown below:

Column 2, line 58, change "weight" to --volume--.

Column 5, line 44, change "weight" to --volume--.

Signed and Sealed this

Second Day of November, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO. : 5,910,214
DATED : June 8, 1999
INVENTOR(S) : You

It is certified that error appears in the above-identified patent and that said Letters Patent is hereby corrected as shown below:

In Table 1, line 6, delete "(% by wt)" and insert -- (% by wt.) --.

In Table 1 - continued, line 5, delete "$CO_2$*" and insert -- $CO_2$-- --.

In column 5, line 14, delete "20 to 40% by weight" and insert -- 20 to 40% by volume --.

Signed and Sealed this

Twenty-fourth Day of October, 2000

Q. TODD DICKINSON

*Attest:*

*Attesting Officer*  *Director of Patents and Trademarks*